United States Patent
Foil et al.

(10) Patent No.: US 12,351,183 B2
(45) Date of Patent: *Jul. 8, 2025

(54) METHODS AND SYSTEMS FOR TRACKING A MOVER'S LANE OVER TIME

(71) Applicant: FORD GLOBAL TECHNOLOGIES, LLC, Dearborn, MI (US)

(72) Inventors: Greydon Foil, Pittsburgh, PA (US); G. Peter K. Carr, Allison Park, PA (US); Andrew T. Hartnett, West Hartford, CT (US); Constantin Savtchenko, Sewickley, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

This patent is subject to a terminal disclaimer.

(21) Appl. No.: 18/151,169

(22) Filed: Jan. 6, 2023

(65) Prior Publication Data

US 2023/0150510 A1    May 18, 2023

Related U.S. Application Data

(63) Continuation of application No. 17/082,198, filed on Oct. 28, 2020, now Pat. No. 11,577,732.

(51) Int. Cl.
*B60W 40/04* (2006.01)
*B60W 60/00* (2020.01)
*G08G 1/16* (2006.01)

(52) U.S. Cl.
CPC ........ *B60W 40/04* (2013.01); *B60W 60/0016* (2020.02); *G08G 1/16* (2013.01)

(58) Field of Classification Search
CPC .... B60W 40/04; B60W 60/0016; G08G 1/16; G01S 13/931; G01S 17/66; G01S 17/931;

(Continued)

(56) References Cited

U.S. PATENT DOCUMENTS 8,055,445 B2 * 11/2011 Schiffmann ........... G01S 13/931
701/117
9,127,956 B2    9/2015 Einecke et al.
(Continued)

FOREIGN PATENT DOCUMENTS

CN    107479547         12/2017
CN    107958269 A       4/2018
(Continued)

OTHER PUBLICATIONS

U.S. Appl. No. 17/082,198, filed Oct. 28, 2020.
(Continued)

*Primary Examiner* — Mary Cheung
(74) *Attorney, Agent, or Firm* — Frank A. MacKenzie; Brooks Kushman P.C.

(57) ABSTRACT

Systems and methods for assigning a lane to an object in an environment of an autonomous vehicle are disclosed. The methods include assigning an instantaneous probability to each of a plurality of lanes in the environment based on a current state of the object, generating a transition matrix for each of the plurality of lanes, and identifying the lane in which the object is moving at the current time t based on the instantaneous probability and the transition matrix. The instantaneous probability is a measure of likelihood that the object is in that lane at a current time. The transition matrix encodes one or more probabilities that the object transitioned either into that lane or out of that lane at the current time.

18 Claims, 7 Drawing Sheets

(58) Field of Classification Search
CPC .... G01S 13/862; G01S 13/865; G01S 13/867; G01S 2013/9318; G01S 2013/93185; G01S 2013/9319; G01S 2013/9323; G01S 2013/9324; G01S 13/723
See application file for complete search history.

(56) References Cited

U.S. PATENT DOCUMENTS

| | | |
|---|---|---|
| 10,309,789 B2 | 6/2019 | Ramasamy |
| 2020/0004246 A1 | 1/2020 | Prasad et al. |

FOREIGN PATENT DOCUMENTS

| | | |
|---|---|---|
| CN | 111284485 | 6/2020 |
| CN | 113720346 | 11/2021 |
| DE | 102020113418 | 11/2020 |

OTHER PUBLICATIONS

Liu, Shiwen, et al. A driving intention prediction method based on hidden Markov model for autonomous driving. Computer Communications, vol. 157, pp. 143-149, ISSN 0140-3664.

J. H. Yang, D. Jung Kim, T. W. Kang, J. Sik Kim and C. C. Chung, "Decision of Driver Intention of a Surrounding Vehicle Using Hidden Markov Model with Optimizing Parameter Estimation," 20th International Conference on Control, Automation and Systems (ICCAS). Oct. 13-16, 2020. pp. 1166-1171.

\* cited by examiner

| Transitioning (from ↓ \ to →) | Lane A | Any other lane |
|---|---|---|
| Lane A | Stays in lane | Moves out of lane A |
| Any other lane | Moves into lane A | Moving outside of lane A |

FIG. 4

METHODS AND SYSTEMS FOR TRACKING A MOVER'S LANE OVER TIME

CROSS-REFERENCE AND CLAIM OF PRIORITY

This patent application is a Continuation of and claims priority to U.S. patent application Ser. No. 17/082,198 filed Oct. 28, 2020, now U.S. Pat. No. 11,577,732 issued on Feb. 14, 2023, the entirety of the priority application is incorporated herein by reference.

BACKGROUND

Understanding environments is one of the fundamental problems for intelligent robots such as autonomous vehicles to perform dependable tasks. For example, navigation of autonomous vehicles relies on tracking the lane followed by detected objects or road users amongst multiple lanes. This requires assignment of one or more lanes to an object at any given point in time while the object is being observed. Accurate tracking of an object's lane and/or lane assignment is crucial for systems such as cruise-control, collision avoidance/mitigation or emergency braking, as the operation depends on the detected object's lane.

A conventional approach to such lane assignment is to predict the forward travel path of the detected object based on parameters such as heading, position, speed, and yaw rate. However, the predicted forward travel path does not necessarily provide a reliable indication of the lane occupied by the object at any given time due to measurement uncertainty. For example, given a single view of a moving object, it is often difficult to identify the lane the object is following. This problem is exacerbated in areas such as intersections, merging lanes, splitting lanes, etc. where the position and heading alone often are not enough to accurately determine the route the object is following. Similarly, when an object transitions from a map-following to non-map-following state or vice versa (for example, when a vehicle enters the road from a driveway or when a vehicle makes an unmapped or illegal maneuver in an intersection), it often becomes difficult to identify the lane being followed by the object.

Consequently, there is a need to accurately assign lanes to objects. This document describes methods and systems that are directed to addressing the problems described above, and/or other issues.

SUMMARY

In various scenarios, methods and systems for assigning a lane to an object in an environment of an autonomous vehicle are disclosed. The methods may include assigning an instantaneous probability to each of a plurality of lanes in the environment based on a current state of the object, generating a transition matrix for each of the plurality of lanes, and identifying the lane in which the object is moving at the current time t based on the instantaneous probability and the transition matrix. The instantaneous probability may be a measure of likelihood that the object is in that lane at a current time. The transition matrix may encode one or more probabilities that the object transitioned either into that lane or out of that lane at the current time.

Implementing systems of the above-described methods can include, but are not limited to, a processor and a non-transitory computer-readable storage medium comprising programming instructions that are configured to cause the processor to implement a method for assigning a lane to an object. Optionally, the programming instructions may be included in a computer program product.

BRIEF DESCRIPTION OF THE DRAWINGS

FIG. 4 illustrates an example initial transition matrix for lane A of FIG. 3.

DETAILED DESCRIPTION

Figure 1:
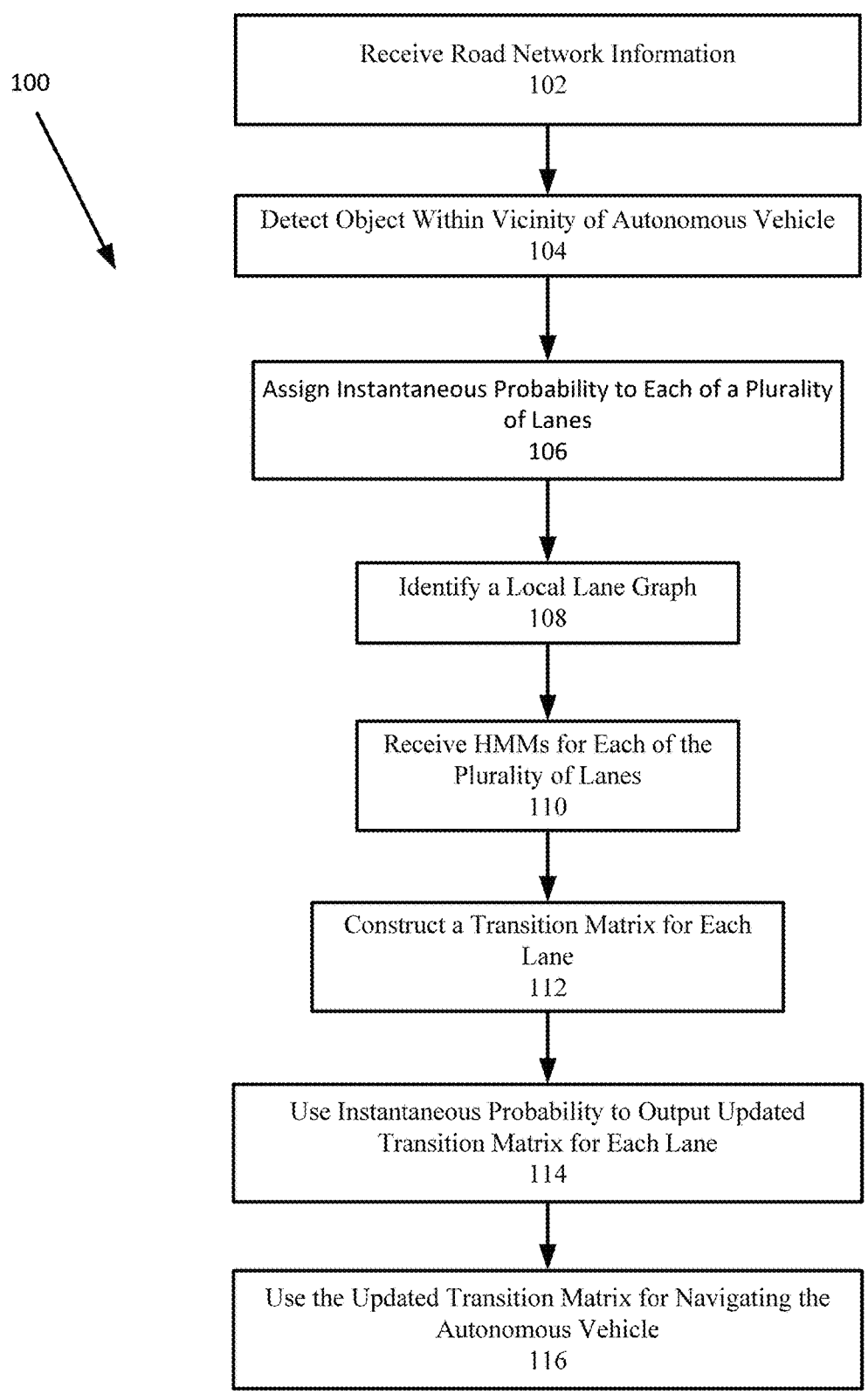
FIG. 1 illustrates a flow chart of an example process for performing ground segmentation

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle operating in an environment may use sensors to automatically identify objects in the environment, and navigate the autonomous vehicle to avoid collision with the detected objects. For avoiding collision with a detected object, it is often also important to identify the lane occupied by the object. For example if the object and the autonomous vehicle are in different lanes, the collision risk may be less. Conversely, the autonomous vehicle may need to take action (e.g., for collision avoidance) more quickly if the object is in the same lane as the autonomous vehicle than if the object is in an adjacent lane, and may take action more quickly if the object is in the adjacent lane than if the object is in a further lane.

The methods and systems of the present disclosure describe determining the lane assignment of a detected object at any given time (i.e., tracking a moving object's lane) using a probabilistic framework that determines how an object might be traveling through an environment. Specifically, the systems and methods determine the route the object is following and the lanes occupied by the object while following the route. The probabilistic framework combines the results of an instantaneous lane classifier, which estimates which lane(s) the mover is following at that exact instant, with a Hidden Markov Model (HMM) whose parameters are determined by a local lane graph. This allows the object's route to be probabilistically tracked over time, and also filters out lanes that do not have a valid route through the map, given the object's prior history. The system considers each lane individually in a one-vs-many approach, instead of encoding the entire scene with a single transition matrix. In the one-vs-many approach, the system determines the probability that a moving object is in lane A, compared against the probability that a moving object is in any other lane.

The methods described in this disclosure are robust to situations where the position and heading are not enough to accurately determine the route the object is following (e.g., at intersections, merging lanes, etc.) and/or when an object transitions from a map-following state to a non-map-following state (e.g., entrance and/or exit from a driveway, illegal maneuvers, etc.). Moreover, the systems and methods of this disclosure provide a multi-label model for lane assignment. Specifically, identifying the lane being followed/occupied by an object is inherently a multi-label problem (instead of a multi-class problem) because it is not possible to determine what route, out of potentially multiple routes, the moving object is going to take in the future. The difference between multi-class and multi-label approaches is that multi-class models converge on a single output (e.g., given a model of traffic light state transitions, determine which bulb is the most likely one to be lit based on the observations), while a multi-label models can consider multiple outputs as valid. This distinction is especially important in, for example, situations where an object occupies multiple lanes (e.g., an object idling in the middle of an intersection where it can overlap multiple splitting lanes, an object turning through an intersection where it may occupy two lanes when executing the turn, etc.). A multi-class model would converge to one of the occupied lanes, while a multi-label model (such as those discussed below) would consider all of the lanes as valid until evidence proves otherwise.

FIG. 1 illustrates a flow chart of an example process 100 for tracking a moving object's lane over time according to an implementation.

At 102, the system may first receive road network information (e.g., a map) corresponding to an environment of the autonomous vehicle, for example, a map data store. In some embodiments, the road network information may include a road network map of the environment. A road network map may be a graphical representation of a collection of interconnected roads included in the geographical area, and may include roads, lanes, and lane segments. A road comprises one or more adjacent lanes, which may be divided by lane markings and are intended for a single line of traffic. Lanes may be split longitudinally at lane segments, sometimes at locations meaningful for motion planning (such as the start/end of an intersection) and/or at other locations that may not be meaningful for motion planning as an artifact of the map generation process. As used herein, a "lane" or a "lane segment" refers to a mapping construct that is associated with a segment of road that has consistent signage on both sides.

Figure 2:
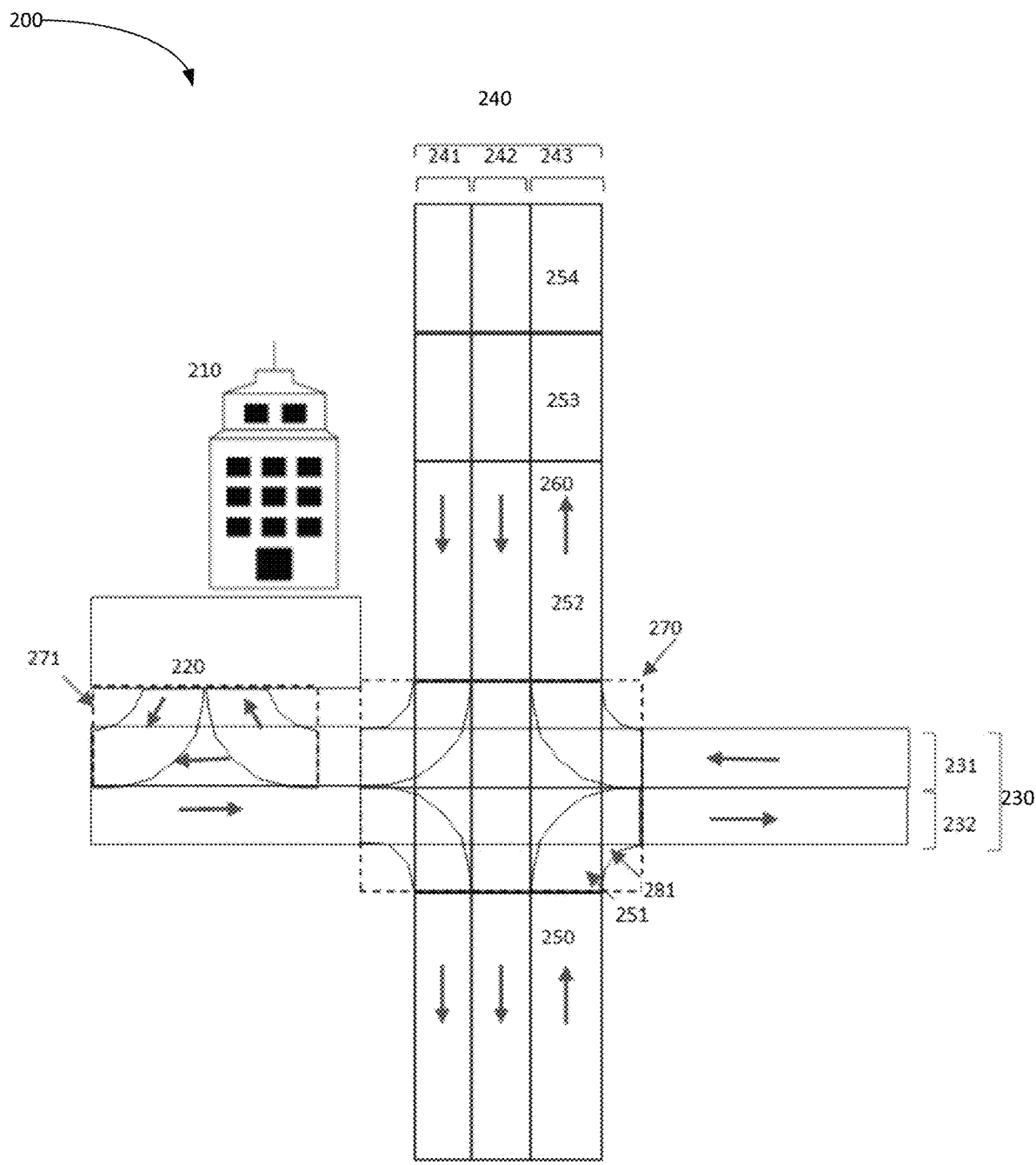
FIG. 2 illustrates an example road network map.

FIG. 2 illustrates a portion of an example road network map 200 that may include one or more non-map areas 210, such as a building and the parking lot 220, and one or more map areas such as roads 230 and 240, or a combination thereof. In some embodiments, the road network information may also include control information, such as direction of travel information, speed limit information, toll information, grade information, such as inclination or angle information, surface material information, aesthetic information, or a combination thereof.

The roads in the road network may include one or more lanes. For example, the road 230 in FIG. 2 comprises the lanes 231 and 232, and the road 240 comprises the lanes 241, 242, and 243. The lanes may be divided into a plurality of lane segments; for example, the lane 243 comprises consecutive lane segments 250, 251, 252, and 253. Each lane segment has an associated direction of travel, which is indicated by the arrows in FIG. 4. For example, the arrow 260 indicates the direction of travel in lane segment 252. The road network also includes intersections which comprise a plurality of lane segments that connect different roads or navigable areas. For example, intersection 270 connects roads 230 and 240, and intersection 271 connects the parking lot 220 to the road 230. Lane segment 250 has two successor lane segments in intersection 270-251 and 281. Lane segment 251 continues lane 243 in road 240, but the other successor lane segment 281 turns right and connects to lane 232 in the crossing road 230.

In some embodiments, receiving the road network information may include transcoding or reformatting the road network information, storing the reformatted road network information, or both. For example, the road network information may be used to create a graph representation of a road network as a vector map, a curvilinear map, a cartesian map, or the like.

At 104, the system may detect an object within the environment (i.e., within a certain distance) of the automated vehicle. This detection may be made based on real-time sensor data output from the object detection sensors (e.g., object detection sensor 762 of FIG. 7 below) of an automated vehicle. The system may also use the received sensor data to determine current state information about the detected object such as, without limitation, a speed of the object, object classification, a direction of travel of the object, pose (including heading and/or orientation), alignment of the object with respect to one or more lanes of the road network and around the object's location, or the like. Object classification may be performed to classify the detected object into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data output from, for example, an object detection sensor such as a LiDAR system, radar and/or sonar system, and/or a camera of the vehicle. Any now or hereafter known object classification techniques can be used such as, without limitation, point cloud labeling, machine learning algorithms for shape/pose estimation, or the like.

The system may use the current state information about the detected object to assign (306) an instantaneous probability to each of a plurality of lanes around the object's location (as determined from the road network map), the probability being an estimation that the object is instantaneously following that lane. The system may consider all the lanes within a certain distance of the object, within a certain radius of the object, or the like. The system (in this step) only utilizes the current state of the detected object to assign the probability, and does not take into account historical information about the object. The system may use a machine learning system such as a classifier to assign the probabilities. For example, in some implementations, the system can be configured to use previously captured training data to determine a classifier for assigning probabilities to one or more lanes corresponding to an object following that lane based on the observed state of the object (e.g., by comparing the observed state of the object with a probability distribution database that correlates observed states with probabilities that the object is instantaneously occupying a certain lane). For example, the system may use training data including observed states of objects, and corresponding probabilities of the objects occupying each lane of one or more lanes at a given time for training the classifier. Examples of such states may include, without limitation, extent or percentage of overlap of an object with a lane, alignment of an object with a lane (i.e., the heading/orientation of the object with respect to a lane), object classification, direction of travel of an object, speed and/or acceleration, heading and/or orientation of an object, or the like. Overlap of an object with a lane may be determined by identifying, for example, the percentage of a polygon representing an object that overlaps that lane. For example, 70% of a polygon corresponding to an object may overlap lane A and 30% may overlap lane B, 100% of a polygon corresponding to an object may overlap lanes A, B, and C simultaneously, 60% of a polygon corresponding to an object may overlap lanes A, B, and C, 30% may overlap lane E, and 10% may overlap lanes F and G, etc. It should be noted that the future path of the object in training data may be known, and can also be used to improve training.

Examples of such classifiers may include, without limitation, an Ensemble classifier such as a Random Forest classifier, Decision Tree classifier, Neural Network classifier Conditional Random Field classifier, Reinforcement Learning classifier, Bayes classifier, or the like. Random forest classifiers are simple classifiers with fast operation during run-time. Random forest classifiers include a series of classifier "trees" (for instance, 25 trees, though any number may be used), each with a root node, two or more leaf nodes, and any number of intermediate nodes and node layers. Each decision tree may output a likelihood of an object occupying a lane, and the probability of an object occupying that lane may be calculated from a quantity of the decision trees that agree and/or as an aggregate of the likelihoods generated by each decision tree.

At 108, the system may identify a local lane graph associated with the current position of the object. The local lane graph in this context refers to a set of information relating to each lane's relationship with other neighboring (nearby), successive, and preceding lanes and may be determined based on, for example, the road network information. For example, the road network map shown in FIG. 3 includes 6 lane segments: A, B, C, D, E, and F. For lane segment A, the local lane graph includes information about lane segment A's relationship with lane segments B, C, D, E, and F. Such information may include that E is a successor lane segment to lane segment A, B is a neighbor lane segment, and C, D, and F have no relationship with lane segment A. Similarly, for lane segment B, the local lane graph includes information about lane segment B's relationship with lane segments A, C, D, E, and F: F is a successor lane segment, A is a neighbor lane segment, and C, D, and E have no relationship with lane segment B. For lane segment F, the local lane graph includes information about lane segment F's relationship with lane segments A, B, C, D, and E: B and C are predecessor lane segments, E is a neighbor lane segment, and A and D have no relationship with lane segment F. Similar relationships may be included for other lane segments.

At 110, the system may generate an HMM associated with each of the lanes that the object may be following (e.g., lanes in the local lane graph around the object's current position). An HMM for each lane comprises a unique signature corresponding to the observed object state when occupying that lane. In particular, occupancy of a lane by an object at any given instant can be represented as a Markov process with unobserved (hidden) states corresponding to occupancy of that lane based on previous states of the object.

More specifically, an HMM is a probabilistic model of sequential data. For example, for a sequence of values $x_1, x_2, \ldots, x_N$, each value $x_i$ (observed state of an object) is modeled as a random variable whose probability density function depends on an underlying, hidden state ($z_i$) that may take discrete values between 1 and K (representative of the lane occupied by the object at any given instantaneous time). For example, if an object is traveling in lane A (hidden state), it is likely that the speed of the vehicle will be approximately the free flow speed for lane A (observed value). Similarly, if the object is in lane A, it is likely that it will make a right turn. For example, the speed information and heading may indicate the speed at which the object is traveling when the current data is captured. The speed information and heading may then be used to determine the probability that the object is in lane A. As a result, an HMM does not capture explicitly the dependence between $x_{i-1}$ and $x_i$; instead, it uses a Markov chain to model the sequence $z_1, z_2, \ldots, z_N$. In other words, the probability distribution of $z_{n-1}$ depends on and is given by a K×K transition matrix $A=(A_{ij})$ where $A_{ij}=P(z_n=j|z_{n-1}=i)$ (where, K is the number of hidden states). Importantly, the states $z_i$ cannot be observed, which is why they are called hidden states. Instead, their value can be inferred from empirical data. Specifically, a transition probability matrix provides a probability that given that an object is in a first lane at time $t_n$, that the object will be in a second lane at time $t_{n+1}$. For example, if it is determined that an object is traveling in lane A of FIG. 5 at time $t_n$, the probability matrix for lane A provides a probability that the vehicle will be in lane B, C, D, E, and F at time $t_{n+1}$ (or vice versa). In some HMM systems, there may be no transitions from a particular one of the states to another particular one of the states. Thus, there may be some elements in A with a value of zero (i.e., zero probability of transition from state i to state j).

The parameters of the HMM (i.e., the number of hidden states, the transition matrix A and the emission probabilities) may either be explicitly defined according to prior knowledge of the system, or they can be learned from empirical data. Prior knowledge may include, for example, various limits (e.g., range of speeds/headings that may be registered by an accelerometer/gyroscope and thus limits placed on the range of values that a particular observation may take, the number of lanes in a particular map area may be provided as input to the system, etc.). Learning from empirical data is generally achieved by estimating and maximizing the likelihood of the HMM with respect to existing data (i.e., learning data). If a learning data set $x=\{x_1, \ldots, x_N\}$, the likelihood function is given by: $p(x|\theta)=\Sigma_z p(x,z|\theta)$, where $\theta$ represents the parameters of the HMM. For instance, since the training data may be generated by test objects following known lanes and/or taken where the path of an observed object is known, the training data including observed object states may be pre-labeled as being associated with following a particular lane. HMMs are generally known learning machine algorithms, and the specifics described herein are merely examples for illustration.

At 112, the system may use the current hidden state of the object (i.e., HMMs for following different lanes) in association with the local lane graph to construct a transition matrix for each lane the object might be following at the instantaneous time step, the transition matrix comprising a likelihood that the object either transitioned into the lane and/or out of the lane at the current instantaneous time step. In other words, transition matrix $T=(T_{ab})$, $T_{ab}$ being the probability that the object transitions from lane "a" in the previous time step to lane "b" in the current time step.

Figure 3:
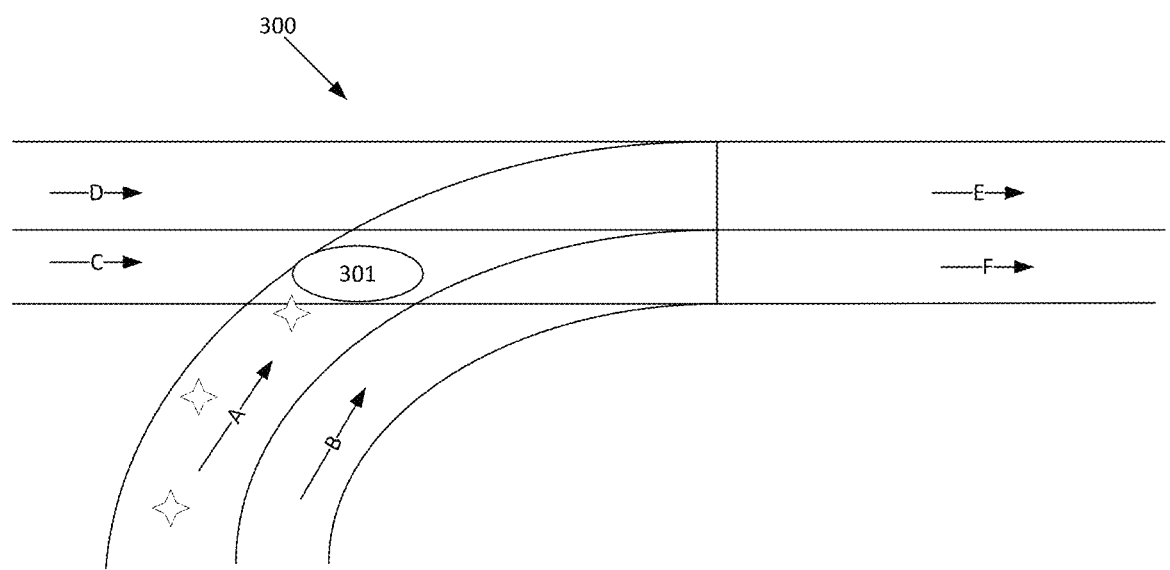
FIG. 3 illustrates an example local lane network proximal to a detected object.
Figure 5:
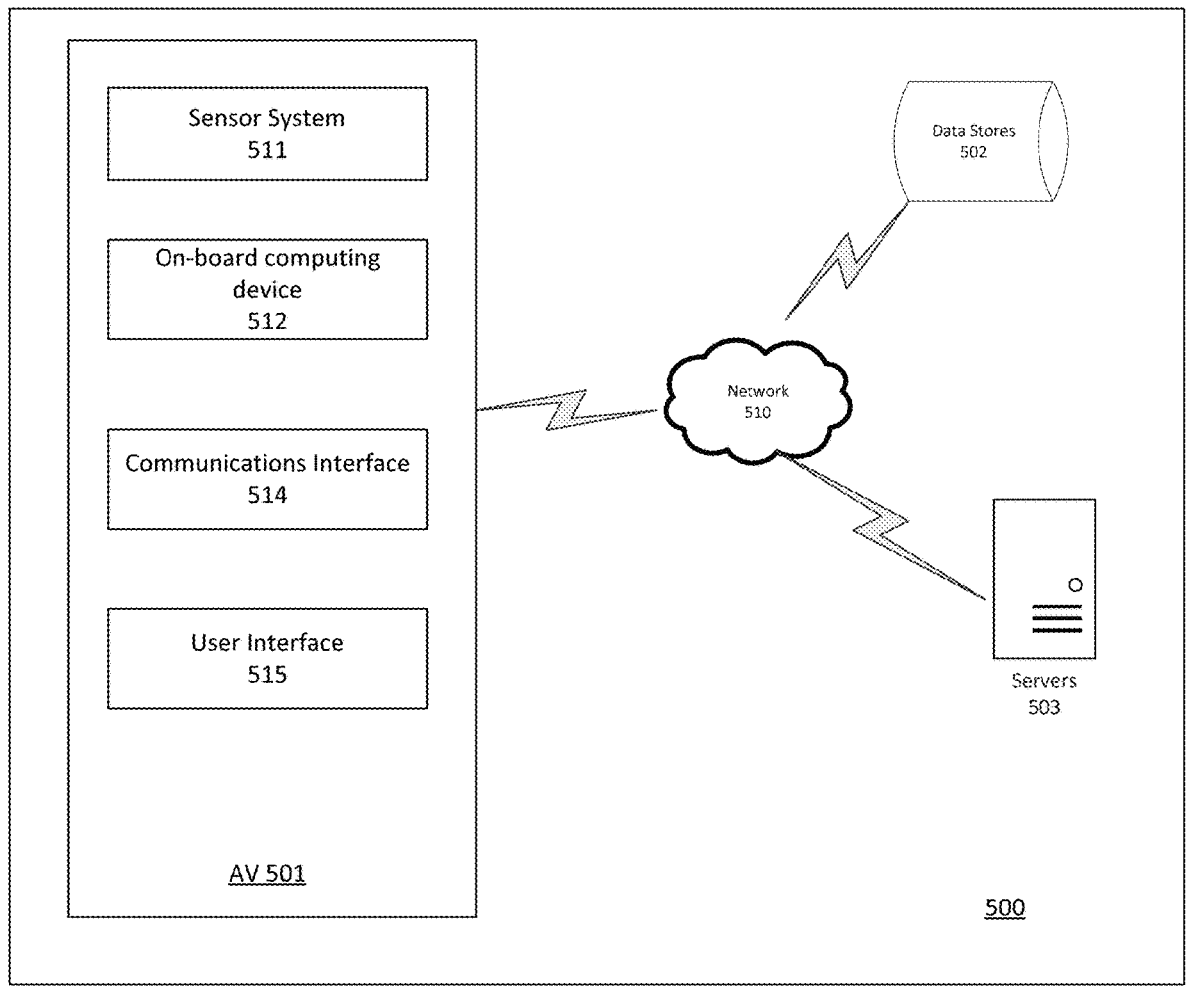
FIG. 5 is a block diagram illustrating an example autonomous vehicle system.

Specifically, given a current observed state of the object, the system may use the HMMs to generate a transition matrix associated with each lane that comprises the likelihood that the object either transitioned into the lane and/or out of the lane at the current instantaneous time step. Furthermore, the system may use the local lane graph relationships to assign a zero probability to certain lane transitions in the transition matrix for each lane. Specifically, for the example shown in FIG. 5, given the relationship of lane A with the other lanes, it can be inferred that if the object is determined to be in lane A at $t_n$, the probability of the object being in lanes C, D, and F at time $t_{n+1}$ is zero (or vice versa). Specifically, the transition matrix of the current disclosure uses the lane graph to determine if it is even possible to transition from one lane to another, limiting the likelihood that an object is predicted to be following some unrelated lane if a lane with a valid path is found. An example output may, therefore, include N 2×2 matrices, where N is the number of lanes in the scene. An example transition matrix for lane A of FIG. 3 is shown in FIG. 4.

At 114, the system may input, for each lane, into the transition matrix of that lane from step 112: (a) the instantaneous probability associated with that lane determined in step 106 and (b) the assigned probability of the object being in that lane at the previous time step, to output an assigned probability (i.e., an updated hidden state probability) for that lane representative of the object being in that lane at the instantaneous current time step. For example, the assigned probability may be obtained by multiplying the instantaneous probability associated with that lane determined in step 106, the assigned probability of the object being in that lane at the previous time step, and the probability of the object transitioning from any of the lanes into that lane as determined from the transition matrix. It should be noted that the assigned probability of the object being in that lane at the previous time step is essentially the output of step 114 performed by the system at the previous time step.

This updates the hidden state internally stored in the HMM to account for the current state of the object (in addition to the local lane graph constraints). This probability determination, therefore, takes into account the object's observed and/or predicted historical states, the current state, and the local environment.

Optionally, the system may output the lane for which a highest probability score is generated as the lane being followed by the object.

At 116, the system may use the probability score associated with each lane (and/or the output that the object is following a particular lane) for navigating an autonomous vehicle. For example, if the object is determined to have a high probability of being in the same lane as the autonomous vehicle and the distance between the object and the autonomous vehicle is decreasing, the autonomous vehicle may undertake an collision avoidance maneuver (e.g., increase the distance by slowing down or speeding up, change lanes, etc.).

As an example, considering the example shown in FIG. 3, given a single observation of the object 301, it is not possible to determine whether the object is following lane A, B, or C; and the object may have similar instantaneous probabilities of occupying either of the three lanes. However, considering the prior path of the object (i.e., the transition matrices associated with the lanes and the prior probability that the object was following those lanes) along with the probability of the object instantaneously occupying a particular lane, it may be determined that the object is likely following lane A (and not B or C). Specifically, based on the path estimated to be followed by the object at previous time steps (using the HMMs), it can be determined that every prior state had a high probability of following lane A. And, therefore, the system may determine that the current probability that the object is following lane A or B is high, while the probability of following lane C is negligible (since there is no mapped transition between lanes A and C). The relative probabilities of the occupying lanes A and B may similarly determined based on the instantaneous state of the object and/or the prior states of the object.

FIG. 5 is a block diagram illustrating an example system 100 that includes an autonomous vehicle 501 in communication with one or more data stores 502 and/or one or more servers 503 via a network 510. Although there is one autonomous vehicle shown, multiple autonomous vehicles may be coupled to each other and/or coupled to data stores 502 and/or servers 503 over network 510. Network 510 may be any type of network such as a local area network (LAN), a wide area network (WAN) such as the Internet, a cellular network, a satellite network, or a combination thereof, and may be wired or wireless. Data store(s) 502 may be any kind of data stores such as, without limitation, map data store(s), traffic information data store(s), user information data store(s), point of interest data store(s), or any other type of content data store(s). Server(s) 503 may be any kind of servers or a cluster of servers, such as, without limitation, Web or cloud servers, application servers, backend servers, or a combination thereof.

As illustrated in FIG. 5, the autonomous vehicle 501 may include a sensor system 511, an on-board computing device 512, a communications interface 514, and a user interface 515. Autonomous vehicle 501 may further include certain components (as illustrated, for example, in FIG. 2) included in vehicles, such as, an engine, wheels, steering wheel, transmission, etc., which may be controlled by the on-board computing device 512 using a variety of communication signals and/or commands, such as, for example, acceleration signals or commands, deceleration signals or commands, steering signals or commands, braking signals or commands, etc.

The sensor system 511 may include one or more sensors that are coupled to and/or are included within the autonomous vehicle 501. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 501, information about the environment itself, information about the motion of the autonomous vehicle 501, information about a route of the autonomous vehicle, or the like. As autonomous vehicle 501 travels over a surface, at least some of the sensors may collect data pertaining to the surface.

The LIDAR system may include a sensor configured to sense or detect objects in an environment in which the autonomous vehicle 501 is located using light. Generally, LIDAR system is a device that incorporates optical remote sensing technology that can measure distance to, or other properties of, a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam, and scan the beam to generate two dimensional or three dimensional range matrices. In examples, the LIDAR system may include components such as light (e.g., laser) source, scanner and optics, photo-detector and receiver electronics, and position and navigation system. In an example, the LIDAR system may be configured to use ultraviolet (UV), visible, or infrared light to image objects and can be used with a wide range of targets, including non-metallic objects. In one example, a narrow laser beam can be used to map physical features of an object with high resolution.

Figure 6:
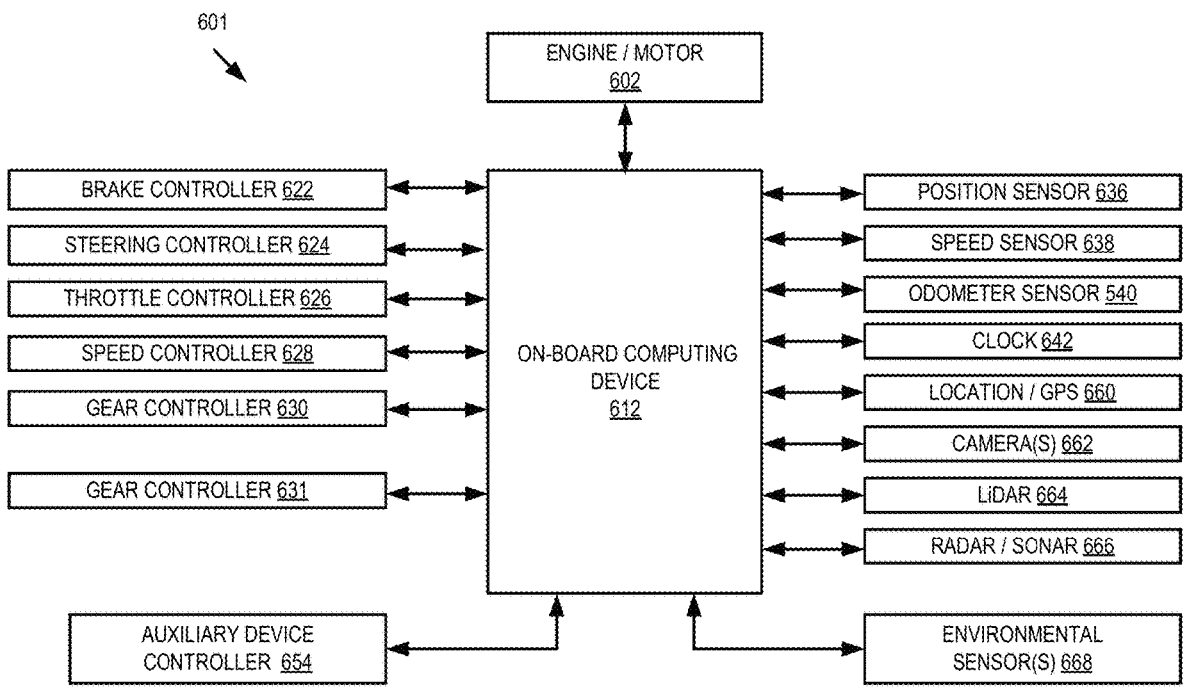
FIG. 6 illustrates an example vehicle controller system.

FIG. 6 illustrates an example system architecture for a vehicle 601, such as the autonomous vehicle 501 of FIG. 5 autonomous vehicle. The vehicle 601 may include an engine or motor 602 and various sensors for measuring various parameters of the vehicle and/or its environment. Operational parameter sensors that are common to both types of vehicles include, for example: a position sensor 636 such as an accelerometer, gyroscope and/or inertial measurement unit; a speed sensor 638; and an odometer sensor 640. The vehicle 601 also may have a clock 642 that the system architecture uses to determine vehicle time during operation. The clock 642 may be encoded into the vehicle on-board computing device 612, it may be a separate device, or multiple clocks may be available.

The vehicle 601 also may include various sensors that operate to gather information about the environment in which the vehicle is traveling. These sensors may include, for example: a location sensor 660 such as a GPS device; object detection sensors such as one or more cameras 662; a LiDAR sensor system 664; and/or a radar and or and/or a sonar system 666. The sensors also may include environmental sensors 668 such as a precipitation sensor and/or ambient temperature sensor. The object detection sensors may enable the vehicle 601 to detect objects that are within a given distance or range of the vehicle 601 in any direction, while the environmental sensors collect data about environmental conditions within the vehicle's area of travel. The system architecture will also include one or more cameras 662 for capturing images of the environment.

During operations, information is communicated from the sensors to an on-board computing device 612. The on-board computing device 612 analyzes the data captured by the sensors and optionally controls operations of the vehicle based on results of the analysis. For example, the on-board computing device 612 may control braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers such as an auxiliary device controller 654.

Geographic location information may be communicated from the location sensor 660 to the on-board computing device 612, which may then access a map of the environment that corresponds to the location information to determine known fixed features of the environment such as streets, buildings, stop signs and/or stop/go signals. Captured images from the cameras 662 and/or object detection information captured from sensors such as a LiDAR system 664 is communicated from those sensors) to the on-board computing device 612. The object detection information and/or captured images may be processed by the on-board computing device 612 to detect objects in proximity to the vehicle 601. In addition or alternatively, the vehicle 601 may transmit any of the data to a remote server system 103 (FIG. 1) for processing. Any known or to be known technique for making an object detection based on sensor data and/or captured images can be used in the embodiments disclosed in this document.

The on-board computing device 612 may obtain, retrieve, and/or create map data that provides detailed information about the surrounding environment of the autonomous vehicle 601. The on-board computing device 612 may also determine the location, orientation, pose, etc. of the AV in the environment (localization) based on, for example, three dimensional position data (e.g., data from a GPS), three dimensional orientation data, predicted locations, or the like. For example, the on-board computing device 612 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 612 in analyzing the surrounding environment of the autonomous vehicle 601. The map data may also include information and/or rules for determining right of way of objects and/or vehicles in conflicted areas or spaces.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 612 may also include and/or may receive information relating to the trip or route of a user, real-time traffic information on the route, or the like.

The on-board computing device 612 may include and/or may be in communication with a routing controller 631 that generates a navigation route from a start position to a destination position for an autonomous vehicle. The routing controller 631 may access a map data store to identify possible routes and road segments that a vehicle can travel on to get from the start position to the destination position. The routing controller 631 may score the possible routes and identify a preferred route to reach the destination. For example, the routing controller 631 may generate a navigation route that minimizes Euclidean distance traveled or other cost function during the route, and may further access the traffic information and/or estimates that can affect an amount of time it will take to travel on a particular route. Depending on implementation, the routing controller 631 may generate one or more routes using various routing methods, such as Dijkstra's algorithm, Bellman-Ford algorithm, or other algorithms. The routing controller 631 may also use the traffic information to generate a navigation route that reflects expected conditions of the route (e.g., current day of the week or current time of day, etc.), such that a route generated for travel during rush-hour may differ from a route generated for travel late at night. The routing controller 631 may also generate more than one navigation route to a destination and send more than one of these navigation routes to a user for selection by the user from among various possible routes.

In various implementations, an on-board computing device 612 may determine perception information of the surrounding environment of the autonomous vehicle 601. Based on the sensor data provided by one or more sensors and location information that is obtained, the on-board computing device 612 may determine perception information of the surrounding environment of the autonomous vehicle 601. The perception information may represent what an ordinary driver would perceive in the surrounding environment of a vehicle. The perception data may include information relating to one or more objects in the environment of the autonomous vehicle 601. For example, the on-board computing device 612 may process sensor data (e.g., LIDAR or RADAR data, camera images, etc.) in order to identify objects and/or features in the environment of autonomous vehicle 601. The objects may include traffic signals, road way boundaries, other vehicles, pedestrians, and/or obstacles, etc. The on-board computing device 612 may use any now or hereafter known object recognition algorithms, video tracking algorithms, and computer vision algorithms (e.g., track objects frame-to-frame iteratively over a number of time periods) to determine the perception. The perception information may include objects identified by discarding ground LIDAR point, as discussed below.

In some embodiments, the on-board computing device 612 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information. As discussed below in more detail, the on-board computing device 612 may also identify a lane being occupied by an object at any given time.

The on-board computing device 612 may perform one or more prediction and/or forecasting operations. For example, the on-board computing device 612 may predict future locations, trajectories, and/or actions of one or more objects. For example, the on-board computing device 612 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 601, the surrounding environment, and/or their relationship(s). For example, if an object is a vehicle and the current driving environment includes an intersection, the on-board computing device 612 may predict whether the object will likely move straight forward or make a turn. If the perception data indicates that the intersection has no traffic light, the on-board computing device 612 may also predict whether the vehicle may have to fully stop prior to enter the intersection.

In various embodiments, the on-board computing device 612 may determine a motion plan for the autonomous vehicle. For example, the on-board computing device 612 may determine a motion plan for the autonomous vehicle based on the perception data and/or the prediction data. Specifically, given predictions about the future locations of proximate objects and other perception data, the on-board computing device 612 can determine a motion plan for the autonomous vehicle 601 that best navigates the autonomous vehicle relative to the objects at their future locations.

In one or more embodiments, the on-board computing device 612 may receive predictions and make a decision regarding how to handle objects in the environment of the autonomous vehicle 601. For example, for a particular object (e.g., a vehicle with a given speed, direction, turning angle, etc.), the on-board computing device 612 decides whether to overtake, yield, stop, and/or pass based on, for example, traffic conditions, map data, state of the autonomous vehicle, etc. Furthermore, the on-board computing device 612 also plans a path for the autonomous vehicle 601 to travel on a given route, as well as driving parameters (e.g., distance, speed, and/or turning angle). That is, for a given object, the on-board computing device 612 decides what to do with the object and determines how to do it. For example, for a given object, the on-board computing device 612 may decide to pass the object and may determine whether to pass on the left side or right side of the object (including motion parameters such as speed). The on-board computing device 612 may also assess the risk of a collision between a detected object and the autonomous vehicle 601. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 612 may execute one or more control instructions to perform a cautious maneuver (e.g., mildly slow down, accelerate, change lane, or swerve). In contrast, if the collision cannot be avoided, then the on-board computing device 612 may execute one or more control instructions for execution of an emergency maneuver (e.g., brake and/or change direction of travel).

For example, if the on-board computing device 612 determines that based on the object trajectory forecasts, an object is likely to break a right of way agreement with the autonomous vehicle, the on-board computing device 612 may determine a motion plan for the autonomous vehicle that avoids collision with such an object in a conflicted space.

As discussed above, planning and control data regarding the movement of the autonomous vehicle is generated for execution. The on-board computing device 612 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 5, the communications interface 514 may be configured to allow communication between autonomous vehicle 501 and external systems, such as, for example, external devices, sensors, other vehicles, servers, data stores, databases etc. Communications interface 514 may utilize any now or hereafter known protocols, protection schemes, encodings, formats, packaging, etc. such as, without limitation, Wi-Fi, an infrared link, Bluetooth, etc. User interface system 515 may be part of peripheral devices implemented within vehicle 501 including, for example, a keyboard, a touch screen display device, a microphone, and a speaker, etc.

Figure 7:
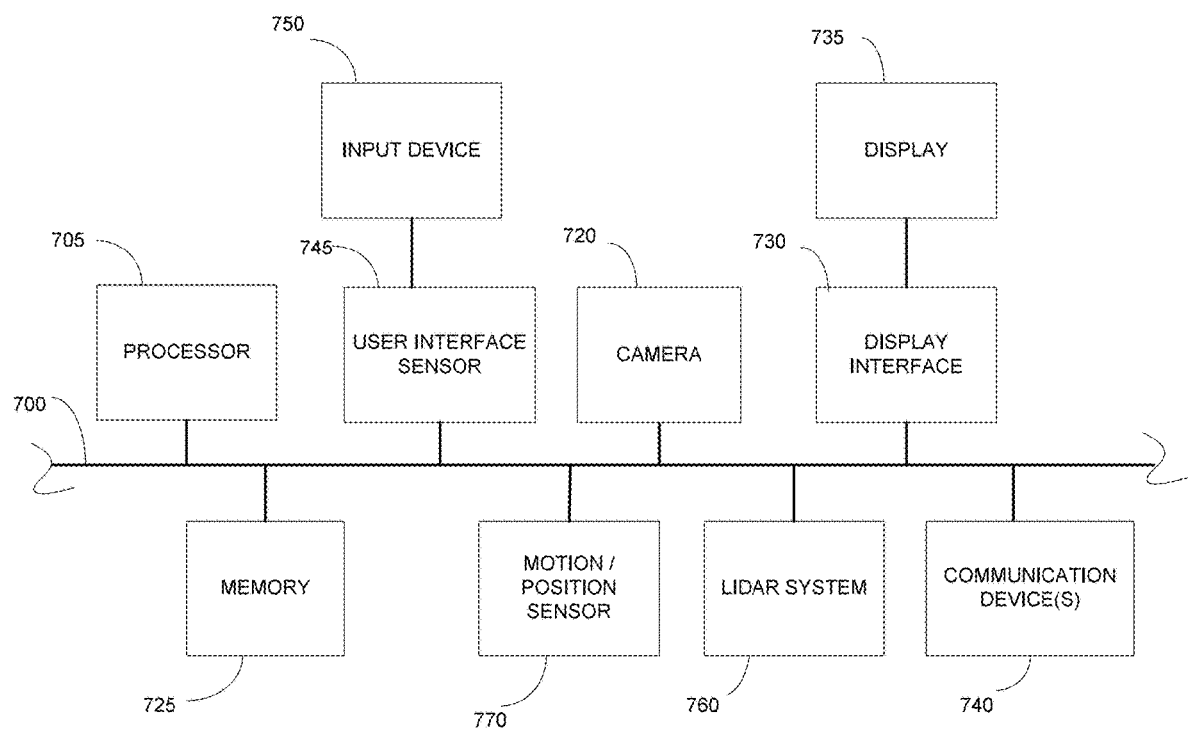
FIG. 7 is a block diagram that illustrates various elements of a possible electronic system, subsystem, controller and/or other component of an AV, and/or external electronic device.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors, and/or devices to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 780 such as an accelerometer, gyroscope or inertial measurement unit. The system also may receive data from a LiDAR system 760 such as that described earlier in this document.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described in this document. The features from different embodiments disclosed herein may be freely combined. For example, one or more features from a method embodiment may be combined with any of the system or product embodiments. Similarly, features from a system or product embodiment may be combined with any of the method embodiments herein disclosed.

As described above, this document discloses system, method, and computer program product embodiments for assigning lanes to one or more objects in the environment of an autonomous vehicle are disclosed. The computer program embodiments include programming instructions (e.g., stored in a memory), to cause a processor to perform the lane assignment and autonomous vehicle navigation methods described in this document. The system embodiments also include a processor which is configured to perform the lane assignment and autonomous vehicle navigation methods described in this document, e.g., via the programming instructions. More generally, the system embodiments include a system comprising means to perform the steps of the any of the methods described in this document.

In various embodiments, methods may include assigning an instantaneous probability to each of a plurality of lanes in the environment based on a current state of the object, generating a transition matrix for each of the plurality of lanes, and identifying the lane in which the object is moving at the current time t based on the instantaneous probability and the transition matrix. The instantaneous probability may be a measure of likelihood that the object is in that lane at a current time. The transition matrix may encode one or more probabilities that the object transitioned either into that lane or out of that lane at the current time.

In various embodiments, the methods may also include using the identification of the lane to control navigation of the autonomous vehicle in the environment.

Optionally, in any of the above embodiments, identifying the lane in which the object is moving at the current time t may include identifying one of the plurality of lanes that has a highest assigned probability as the lane in which the object is moving at the current time t, the assigned probability of each lane being a measure of likelihood of the object occupying that lane at the current time step. Optionally, the methods may also include determining the assigned probability associated with each of the plurality of lanes by multiplying the instantaneous probability associated with that lane, a previously assigned probability associated with that lane as a measure of likelihood of the object occupying that lane at a previous time step, and a probability of the object transitioning from any of the plurality of lanes into that lane as determined from the transition matrix.

Optionally, in any of the above embodiments, the transition matrix for each of the plurality of lanes may be generated by receiving a Hidden Markov Model (HMM) for each of the plurality of lanes, and using the current state of the object and the HMM to generate an initial transition matrix encoding one or more probabilities that the object transitioned to or from that lane from or to another lane in the environment at the current time t. Additionally and/or alternatively, the relationships between the plurality of lanes may be used for updating the initial transition matrix and generating the transition matrix for each of the plurality of lanes such that they include information relating to valid paths for transitioning between each of the plurality of lanes. In various embodiments, the relationships between the plurality of lanes may be determined using a road network map. Optionally, one or more parameters for generating the HMM for each of the plurality of lanes may also be determined using training data that includes observed states of a plurality of objects associated with known information relating to lanes occupied by the plurality of objects.

In any of the above embodiments, the methods may also include assigning the instantaneous probability to each of the plurality of lanes in the environment of the autonomous vehicle by determining at least one of the following using sensor data-percentage of overlap of the object with that lane, alignment of the object with that lane; object classification, direction of travel of the object, speed of the object, acceleration of the object and/or pose of the object In any of the above embodiments, a random forest classifier may be used for assigning the instantaneous probability to each of the plurality of lanes in the environment of the autonomous vehicle.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

An "electronic device" or a "computing device" refers to a device that includes a processor and memory. Each device may have its own processor and/or memory, or the processor and/or memory may be conflicted with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for generating vehicle trajectories. The system embodiments include a processor or computing device implementing the methods for generating vehicle trajectories. The computer program embodiments include programming instructions, for example, stored in a memory, to cause a processor to perform the methods described in this document. The system embodiments also include a processor which is configured to perform the methods described in this document, for example, via the programming instructions. More generally, the system embodiments include a system comprising means to perform the steps of any of the methods described in this document.

Without excluding further possible embodiments, certain example embodiments are summarized in the following clauses.

Clause 1. A method of assigning a lane to an object in an environment of an autonomous vehicle, the method comprising:

assigning, based on a current state of the object, an instantaneous probability to each of a plurality of lanes in the environment, the instantaneous probability being a measure of likelihood that the object is in that lane at a current time t;

generating a transition matrix for each of the plurality of lanes, the transition matrix encoding one or more probabilities that the object transitioned either into that lane or out of that lane; and identifying, based on the instantaneous probability and the transition matrix, the lane in which the object is moving at the current time t.

Clause 2. The method of clause 1, further comprising using the identification of the lane to control navigation of the autonomous vehicle in the environment.

Clause 3. The method of any of the above clauses, wherein identifying the lane in which the object is moving at the current time t comprises identifying one of the plurality of lanes that has a highest assigned probability as the lane in which the object is moving at the current time t, the assigned probability of each lane being a measure of likelihood of the object occupying that lane at the current time step.

Clause 4. The method of clause 3, further comprising determining the assigned probability associated with each of the plurality of lanes by multiplying the instantaneous probability associated with that lane, a previously assigned probability associated with that lane as a measure of likelihood of the object occupying that lane at a previous time step, and a probability of the object transitioning from any of the plurality of lanes into that lane as determined from the transition matrix.

Clause 5. The method of any of the above clauses, wherein generating the transition matrix for each of the plurality of lanes comprises:

receiving a Hidden Markov Model (HMM) for each of the plurality of lanes; and using the current state of the object and the HMM to generate an initial transition matrix encoding one or more probabilities that the object transitioned to or from that lane from or to another lane in the environment at the current time t.

Clause 6. The method of clause 5, further comprising using relationships between the plurality of lanes for updating the initial transition matrix and generating the transition matrix for each of the plurality of lanes, wherein the relationships between the plurality of lanes include information relating to valid paths for transitioning between each of the plurality of lanes.

Clause 7. The method of clause 6, further comprising determining the relationships between the plurality of lanes using a road network map.

Clause 8. The method of any of the above clauses, further comprising identifying one or more parameters for generating the HMM for each of the plurality of lanes using training data, the training data comprising observed states of a plurality of objects associated with known information relating to lanes occupied by the plurality of objects.

Clause 9. The method of any of the above clauses, wherein assigning the instantaneous probability to each of the plurality of lanes in the environment of the autonomous vehicle comprises determining, using sensor data corresponding to the environment, at least one of the following: percentage of overlap of the object with that lane; alignment of the object with that lane;

object classification; direction of travel of the object; speed of the object; acceleration of the object; or pose of the object.

Clause 10. The method of any of the above clauses, wherein assigning the instantaneous probability to each of the plurality of lanes in the environment of the autonomous vehicle comprises using a random forest classifier for assigning the instantaneous probabilities.

Clause 11. A system comprising means for performing steps of any of the above method clauses.

Clause 12. A computer program, or a storage medium storing the computer program, comprising instructions, which when executed by one or more suitable processors cause any of the processors to perform the steps of any of the above method clauses.

Clause 13. A system for assigning a lane to an object in an environment of an autonomous vehicle, the system comprising:
at least one processor;
programming instructions stored in a memory and configured to cause the processor to:
assign, based on a current state of the object, an instantaneous probability to each of a plurality of lanes in the environment, the instantaneous probability being a measure of likelihood that the object is in that lane at a current time t;
generate a transition matrix for each of the plurality of lanes, the transition matrix encoding one or more probabilities that the object transitioned either into that lane or out of that lane; and
identify, based on the instantaneous probability and the transition matrix, the lane in which the object is moving at the current time t.

Clause 14. The system of clause 13, further comprising programming instructions configured to cause the processor to use the identification of the lane to control navigation of the autonomous vehicle in the environment.

Clause 15. The system of any of the above system clauses, wherein the programming instructions that cause the processor to identify the lane in which the object is moving at the current time t comprise programming instructions configured to cause the processor to identify one of the plurality of lanes that has a highest assigned probability as the lane in which the object is moving at the current time t, the assigned probability of each lane being a measure of likelihood of the object occupying that lane at the current time step.

Clause 16. The system of clause 15, further comprising programming instructions configured to cause the processor to determine the assigned probability associated with each of the plurality of lanes by multiplying the instantaneous probability associated with that lane, a previously assigned probability associated with that lane as a measure of likelihood of the object occupying that lane at a previous time step, and a probability of the object transitioning from any of the plurality of lanes into that lane as determined from the transition matrix.

Clause 17. The system of any of the above system clauses, wherein the programming instructions that cause the processor to generate the transition matrix for each of the plurality of lanes comprise programming instructions configured to cause the processor to:
receive a Hidden Markov Model (HMM) for each of the plurality of lanes; and
use the current state of the object and the HMM to generate an initial transition matrix encoding one or more probabilities that the object transitioned to or from that lane from or to another lane in the environment at the current time t.

Clause 18. The system of clause 17, further comprising programming instructions configured to cause the processor to use relationships between the plurality of lanes for updating the initial transition matrix and generating the transition matrix for each of the plurality of lanes, wherein the relationships between the plurality of lanes include information relating to valid paths for transitioning between each of the plurality of lanes.

Clause 19. The system of claim 17, further comprising programming instructions configured to cause the processor to identify one or more parameters for generating the HMM for each of the plurality of lanes using training data, the training data comprising observed states of a plurality of objects associated with known information relating to lanes occupied by the plurality of objects.

Clause 20. The system of any of the above system clauses wherein the programming instructions that cause the processor to assign the instantaneous probability to each of the plurality of lanes in the environment of the autonomous vehicle comprise programming instructions to cause the processor to determine, using sensor data corresponding to the environment, at least one of the following: percentage of overlap of the object with that lane; alignment of the object with that lane; object classification; direction of travel of the object; speed of the object; acceleration of the object; or pose of the object.

Clause 21. The system of any of the above system clauses wherein the programming instructions that cause the processor to assign the instantaneous probability to each of the plurality of lanes in the environment of the autonomous vehicle comprise programming instructions to cause the processor to use a random forest classifier for assigning the instantaneous probabilities.

Clause 22. A computer program product comprising a non-transitory computer-readable medium that stores instructions that, when executed by a computing device, will cause the computing device to perform operations comprising:
assigning, based on a current state of an object, an instantaneous probability to each of a plurality of lanes in an environment of an autonomous vehicle, the instantaneous probability being a measure of likelihood that the object is in that lane at a current time t;
generating a transition matrix for each of the plurality of lanes, the transition matrix encoding one or more probabilities that the object transitioned either into that lane or out of that lane; and
identifying, based on the instantaneous probability and the transition matrix, the lane in which the object is moving at the current time t.

What is claimed is:

1. A method of assigning a lane to an object in an environment of an autonomous vehicle, the method comprising:
assigning, based on a current state of the object, an instantaneous probability to each of a plurality of lanes in the environment, the instantaneous probability being a measure of likelihood that the object is in that lane at a current time t;

generating a transition matrix for each of the plurality of lanes, the transition matrix encoding one or more probabilities that the object transitioned either into that lane or out of that lane;

identifying, based on the instantaneous probability and the transition matrix, the lane in which the object is moving at the current time t; and using the identification of the lane to control navigation of the autonomous vehicle in the environment.

2. The method of claim 1, wherein identifying the lane in which the object is moving at the current time t comprises identifying one of the plurality of lanes that has a highest assigned probability as the lane in which the object is moving at the current time t, the assigned probability of each lane being a measure of likelihood of the object occupying that lane at the current time step.

3. The method of claim 2, further comprising determining the assigned probability associated with each of the plurality of lanes by multiplying the instantaneous probability associated with that lane, a previously assigned probability associated with that lane as a measure of likelihood of the object occupying that lane at a previous time step, and a probability of the object transitioning from any of the plurality of lanes into that lane as determined from the transition matrix.

4. The method of claim 1, wherein generating the transition matrix for each of the plurality of lanes comprises:
receiving a Hidden Markov Model (HMM) for each of the plurality of lanes; and
using the current state of the object and the HMM to generate an initial transition matrix encoding one or more probabilities that the object transitioned to or from that lane from or to another lane in the environment at the current time t.

5. The method of claim 4, further comprising using relationships between the plurality of lanes for updating the initial transition matrix and generating the transition matrix for each of the plurality of lanes, wherein the relationships between the plurality of lanes include information relating to valid paths for transitioning between each of the plurality of lanes.

6. The method of claim 5, further comprising determining the relationships between the plurality of lanes using a road network map.

7. The method of claim 4, further comprising identifying one or more parameters for generating the HMM for each of the plurality of lanes using training data, the training data comprising observed states of a plurality of objects associated with known information relating to lanes occupied by the plurality of objects.

8. The method of claim 1, wherein assigning the instantaneous probability to each of the plurality of lanes in the environment of the autonomous vehicle comprises determining, using sensor data corresponding to the environment, at least one of the following: percentage of overlap of the object with that lane; alignment of the object with that lane; object classification; direction of travel of the object; speed of the object; acceleration of the object; or pose of the object.

9. The method of claim 1, wherein assigning the instantaneous probability to each of the plurality of lanes in the environment of the autonomous vehicle comprises using a random forest classifier for assigning the instantaneous probabilities.

10. A system for assigning a lane to an object in an environment of an autonomous vehicle, the system comprising:
at least one processor;
programming instructions stored in a memory and configured to cause the processor to:
assign, based on a current state of the object, an instantaneous probability to each of a plurality of lanes in the environment, the instantaneous probability being a measure of likelihood that the object is in that lane at a current time t;
generate a transition matrix for each of the plurality of lanes, the transition matrix encoding one or more probabilities that the object transitioned either into that lane or out of that lane;
identify, based on the instantaneous probability and the transition matrix, the lane in which the object is moving at the current time t; and
use the identification of the lane to control navigation of the autonomous vehicle in the environment.

11. The system of claim 10, wherein the programming instructions that cause the processor to identify the lane in which the object is moving at the current time t comprise programming instructions configured to cause the processor to identify one of the plurality of lanes that has a highest assigned probability as the lane in which the object is moving at the current time t, the assigned probability of each lane being a measure of likelihood of the object occupying that lane at the current time step.

12. The system of claim 11, further comprising programming instructions configured to cause the processor to determine the assigned probability associated with each of the plurality of lanes by multiplying the instantaneous probability associated with that lane, a previously assigned probability associated with that lane as a measure of likelihood of the object occupying that lane at a previous time step, and a probability of the object transitioning from any of the plurality of lanes into that lane as determined from the transition matrix.

13. The system of claim 10, wherein the programming instructions that cause the processor to generate the transition matrix for each of the plurality of lanes comprise programming instructions configured to cause the processor to:
receive a Hidden Markov Model (HMM) for each of the plurality of lanes; and
use the current state of the object and the HMM to generate an initial transition matrix encoding one or more probabilities that the object transitioned to or from that lane from or to another lane in the environment at the current time t.

14. The system of claim 13, further comprising programming instructions configured to cause the processor to use relationships between the plurality of lanes for updating the initial transition matrix and generating the transition matrix for each of the plurality of lanes, wherein the relationships between the plurality of lanes include information relating to valid paths for transitioning between each of the plurality of lanes.

15. The system of claim 13, further comprising programming instructions configured to cause the processor to identify one or more parameters for generating the HMM for each of the plurality of lanes using training data, the training data comprising observed states of a plurality of objects associated with known information relating to lanes occupied by the plurality of objects.

16. The system of claim 10, wherein the programming instructions that cause the processor to assign the instantaneous probability to each of the plurality of lanes in the environment of the autonomous vehicle comprise programming instructions to cause the processor to determine, using sensor data corresponding to the environment, at least one of the following: percentage of overlap of the object with that lane; alignment of the object with that lane; object classification; direction of travel of the object; speed of the object; acceleration of the object; or pose of the object.

17. The system of claim 10, wherein the programming instructions that cause the processor to assign the instantaneous probability to each of the plurality of lanes in the environment of the autonomous vehicle comprise programming instructions to cause the processor to use a random forest classifier for assigning the instantaneous probabilities.

18. A computer program product comprising a non-transitory computer-readable medium that stores instructions that, when executed by a computing device, will cause the computing device to perform operations comprising:
  assigning, based on a current state of an object, an instantaneous probability to each of a plurality of lanes in an environment of an autonomous vehicle, the instantaneous probability being a measure of likelihood that the object is in that lane at a current time t;
  generating a transition matrix for each of the plurality of lanes, the transition matrix encoding one or more probabilities that the object transitioned either into that lane or out of that lane;
  identifying, based on the instantaneous probability and the transition matrix, the lane in which the object is moving at the current time t; and
  using the identification of the lane to control navigation of the autonomous vehicle in the environment.

* * * * *